(12) United States Patent
Ho et al.

(10) Patent No.: US 6,701,165 B1
(45) Date of Patent: Mar. 2, 2004

(54) METHOD AND APPARATUS FOR REDUCING INTERFERENCE IN NON-STATIONARY SUBSCRIBER RADIO UNITS USING FLEXIBLE BEAM SELECTION

(75) Inventors: Ming-Ju Ho, Alpharetta, GA (US); Michael Scott Rawles, Acworth, GA (US); Raymond R. Thomas, Atlanta, GA (US); Wen-Kai Yen, Alpharetta, GA (US)

(73) Assignee: Agere Systems Inc., Allentown, PA (US)

( * ) Notice: Subject to any disclaimer, the term of this patent is extended or adjusted under 35 U.S.C. 154(b) by 393 days.

(21) Appl. No.: 09/598,057

(22) Filed: Jun. 21, 2000

(51) Int. Cl.⁷ .................................................. H04M 1/00
(52) U.S. Cl. ............................. 455/562.1; 455/277.1; 455/273; 455/67.11; 455/450
(58) Field of Search ......................... 455/562.1, 277.1, 455/277.2, 288, 289, 450, 67.11, 273; 343/702

(56) References Cited

U.S. PATENT DOCUMENTS

| | | | | |
|---|---|---|---|---|
| 5,848,361 A | * | 12/1998 | Edwards | 455/562.1 |
| 6,049,705 A | * | 4/2000 | Xue | 455/277.1 |
| 6,128,355 A | * | 10/2000 | Backman et al. | 375/347 |
| 6,347,234 B1 | * | 2/2002 | Scherzer | 455/562.1 |
| 6,351,654 B1 | * | 2/2002 | Huang et al. | 455/562.1 |
| 6,453,177 B1 | * | 9/2002 | Wong et al. | 455/562.1 |
| 6,470,174 B1 | * | 10/2002 | Schefte et al. | 455/90.1 |

FOREIGN PATENT DOCUMENTS

GB   2353673 A  * 2/2001  ............ H04B/7/08

* cited by examiner

Primary Examiner—William Trost
Assistant Examiner—Sharad Rampuria
(74) Attorney, Agent, or Firm—Ryan, Mason & Lewis, LLP

(57) ABSTRACT

A method and apparatus are disclosed for beam selection in a non-stationary subscriber radio unit having a multi-beam antenna array. The disclosed multi-beam antenna array acts in an omni-directional manner whenever signal-to-noise ratio (SNR) performance is sufficient, and excludes individual branches, as necessary, on the basis of SNR performance. A multi-mode approach is used to select appropriate antennas in the multi-beam antenna array. A given mode is established on the basis of the SNR of the received signal. Generally, if the SNR of the received signal satisfies predefined criteria, the non-stationary subscriber radio unit will operate the multi-beam antenna array in an omni-directional-like manner, by equally combining the received signal from each individual narrow-beam antenna branch. If the SNR of the received signal fails to satisfy the predefined criteria, the non-stationary subscriber radio unit will operate the multi-beam antenna array in a flex-beam manner that excludes those branches that have exhibited degraded SNR performance. A branch ordering table lists the branches in the multi-beam antenna array in order of their SNR performance. A flex_counter indicates the number of branches that are currently excluded in a flex operating mode due to poor degraded SNR performance. Thus, during the flex mode, the power is redistributed into the remaining transmitting branches (those in the first part of the branch ordering table), until the SNR performance recovers.

18 Claims, 5 Drawing Sheets

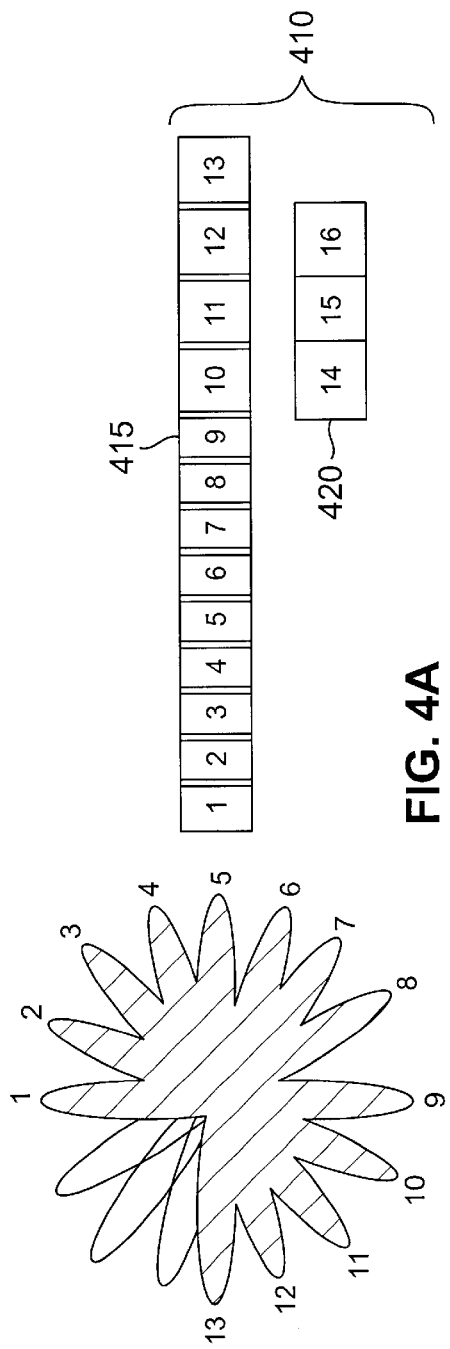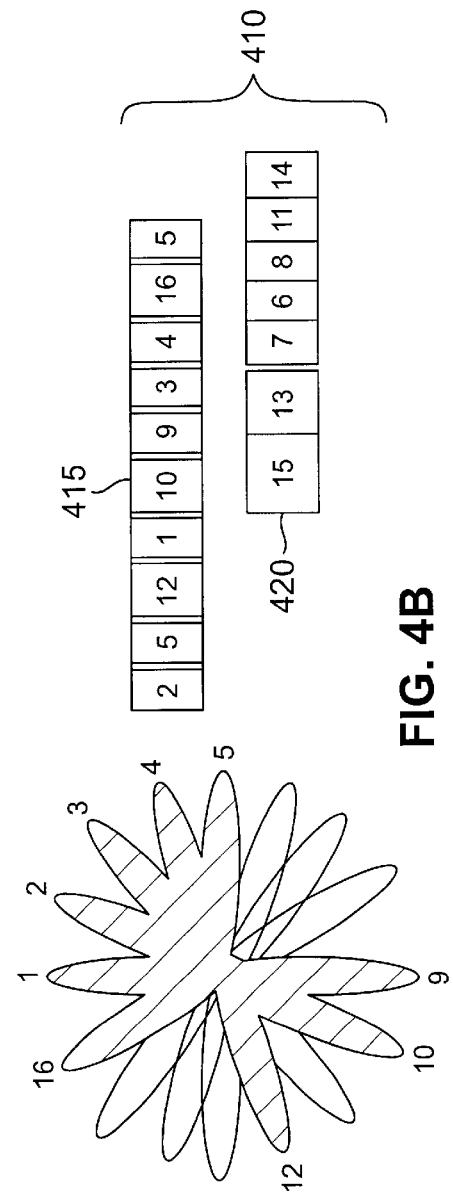
FIG. 4A
FIG. 4B

METHOD AND APPARATUS FOR REDUCING INTERFERENCE IN NON-STATIONARY SUBSCRIBER RADIO UNITS USING FLEXIBLE BEAM SELECTION

FIELD OF THE INVENTION

The present invention relates to wireless mobile radio communications and, more particularly, to beam selection strategies for non-stationary subscriber radio units.

BACKGROUND OF THE INVENTION

Wireless communication networks are increasingly utilized to transfer information, such as data, voice, text or video information, among communication devices. A number of technologies and protocols have been proposed or suggested to maximize the utilization of the available bandwidth in a wireless communication network. Code division multiple access (CDMA), time division multiple access (TDMA) and frequency division multiple access (FDMA) techniques, for example, have been employed in many digital wireless communication systems to permit a large number of system users to communicate with one another.

Many wireless communication systems incorporate a mechanism to reduce co-channel interference on the forward link from a base station or cell site to a mobile receiver unit. Code division multiple access communication systems, for example, reduce co-channel interference on the forward link by modulating the information signals with Walsh orthogonal function sequences.

On the reverse link (subscriber unit-to-base station), the use of a single receive antenna in a base station in a wireless communication system causes a degradation in the received signal quality due to Rayleigh fading. As the path between the subscriber unit and the base station changes with time, due to the movement of the wireless terminal, the received signal quality vacillates, referred to as Rayleigh fading. Rayleigh fading occurs when the multipath components of a signal destructively interfere at the receive antenna causing the signal-to-noise ratio (SNR) of the composite received signal to fall below a predefined threshold.

Thus, base stations typically incorporate an antenna array having a number of spatially diverse receive antennas, to mitigate the effects of Rayleigh fading and other co-channel interference. Antenna array processing techniques mitigate the effects of multiple users by compensating for phase and delay effects. Generally, when the SNR at one receive antenna is low, the signal quality at other antennas in the array is typically satisfactory. Thus, the base station receives the transmitted signal at each antenna, compares the relative signal quality at each antenna, and dynamically selects the best signal.

Currently, there are two approaches for selecting the antenna branch with the best signal. A Switched-Beam Smart Antenna (SBSA) approach reduces interference by selecting the narrow-beam antenna branch with the best uplink (subscriber-to-base) performance. By default, the downlink (base-to-subscriber) transmissions are then over the same selected branch. SBSA is effective for traditional macrocellular base stations with small spreads of Angle-of-Arrival (AOA). For microcellular systems with low base station antenna height, however, the spread of AOA is large due to the scattering environments. Thus, SBSA is not effective in these applications.

Adaptive-Beam Smart Antenna (ABSA) approaches have been employed in environments with low base station antenna height to overcome the co-channel interference in these hostile environments. ABSA modifies the radiation pattern by using internal feedback control. The performance of ABSA techniques is strongly related to how fast the base station can estimate a better propagation channel, which is a major challenge for time-varying signals in wireless radio communications. Consequently, an ABSA approach has a high implementation cost and complexity constraints.

SBSA can be characterized as a "hard beam" selection method because SBSA always selects one and only one narrow-beam branch for transmission. ABSA can be characterized as a "soft beam" selection method because ABSA changes its radiation pattern continuously. It is noted that both SBSA and ABSA are usually restricted to fixed objects, such as a base station, and are not suitable for non-stationary subscriber radio units. For SBSA, it is very difficult to use narrow beam transmission to acknowledge the beacon or pilot signal broadcast by base stations during the handoff process. For ABSA, the complexity and high implementation cost hinders its application to subscriber radio units.

For simplicity, subscriber radio units are usually equipped with low gain omni-directional antennas to suit the subscriber radio movement. However, with omni-directional antenna pattern characterized as non-discrimination reception, the performance degrades significantly when strong co-channel interference is present. A need therefore exists for a method and apparatus for beam selection in a non-stationary subscriber radio unit that reduces co-channel interference. A further need exists for a method and apparatus for beam selection in a non-stationary subscriber radio unit that retains the benefits of an omni-directional like antenna pattern to support handoff and better reception in scattering propagation environments.

SUMMARY OF THE INVENTION

Generally, a method and apparatus are disclosed for beam selection in a non-stationary subscriber radio unit having a multi-beam antenna array. The disclosed multi-beam antenna array acts in an omni-directional manner whenever signal-to-noise ratio (SNR) performance is sufficient, and excludes individual branches, as necessary, on the basis of SNR performance. In this manner, the present invention reduces co-channel interference while also retaining the benefits of an omni-directional like antenna pattern.

The present invention uses a multi-mode approach for the selection of appropriate antennas in the multi-beam antenna array. A given mode is established on the basis of the signal-to-noise ratio (SNR) of the received signal. Generally, if the SNR of the received signal satisfies predefined criteria, the non-stationary subscriber radio unit will operate the multi-beam antenna array in an omni-directional-like manner, by equally combining the received signal from each individual narrow-beam antenna branch. If the SNR of the received signal fails to satisfy the predefined criteria, the non-stationary subscriber radio unit will operate the multi-beam antenna array in a flex-beam manner that excludes those branches that have exhibited degraded SNR performance.

A branch ordering table is disclosed that lists the branches in the multi-beam antenna array in order of their SNR performance. A flex_counter indicates the number of branches that are currently excluded in a flex operating mode due to poor degraded SNR performance. When the non-stationary subscriber radio unit is in a flex operating mode, the received SNR of the next symbol (or frame or packet) is derived by equally combing the received signals from all individual narrow-beam branches, except the branches identified by the Flex_Counter. The transmitted signal is sent using all branches except the ones that are not included in the combined received patterns. Thus, during the flex mode, the power is redistributed into the remaining transmitting branches (those in the first part of the branch ordering table), until the SNR performance recovers.

A more complete understanding of the present invention, as well as further features and advantages of the present invention, will be obtained by reference to the following detailed description and drawings.

BRIEF DESCRIPTION OF THE DRAWINGS

FIGS. 4A and 4B illustrate two examples of the branch ordering table of FIG. 1 in a flex mode according to one embodiment of the present invention.

DETAILED DESCRIPTION

Figure 1:
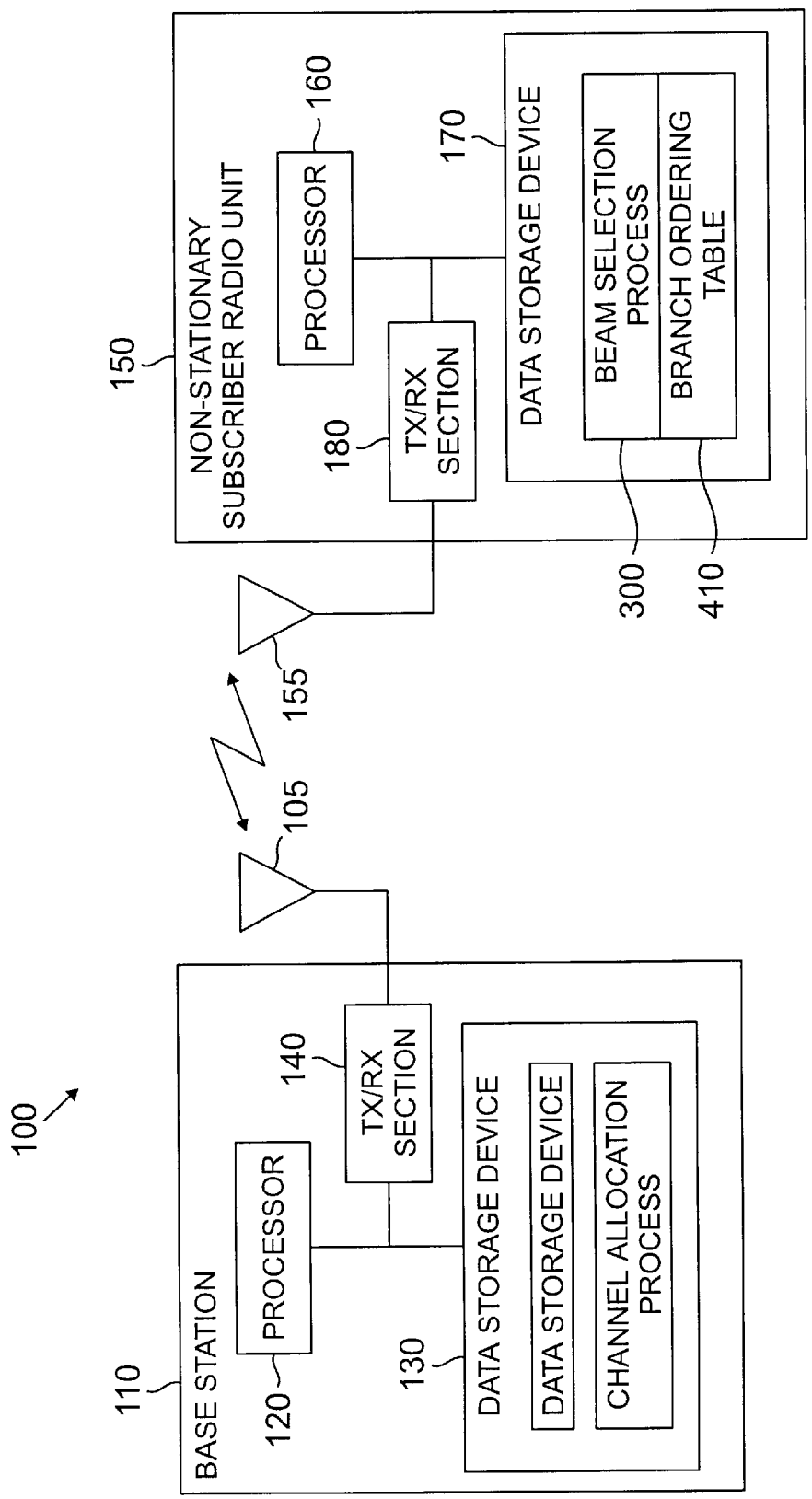
FIG. 1 illustrates a wireless communication system 100 in which the present invention can operate.

FIG. 1 illustrates a wireless communication system 100 in which the present invention can operate. As shown in FIG. 1, the wireless communication system 100 includes an exemplary base station 110 and an exemplary non-stationary subscriber radio unit 150, in accordance with the present invention. According to one feature of the present invention, non-stationary subscriber radio units 150 can use simple, cost-effective, and efficient beam selection techniques for reducing co-channel interference and enhancing link performance. Thus, as discussed below, a non-stationary subscriber radio unit 150 in accordance with the present invention is equipped with a multi-beam antenna array 155.

As discussed further below in a section entitled "Multi-Mode Beam Selection," the present invention uses a multi-mode approach for the selection of appropriate antennas in the multi-beam antenna array 155. A given mode is established on the basis of the signal-to-noise ratio (SNR) of the received signal. Generally, if the SNR of the received signal satisfies predefined criteria, the non-stationary subscriber radio unit 150 will operate the multi-beam antenna array 155 in an omni-directional-like manner, by equally combining the received signal from each individual narrow-beam antenna branch. If, however, the SNR of the received signal fails to satisfy the predefined criteria, the non-stationary subscriber radio unit 150 will operate the multi-beam antenna array 155 in a flex-beam manner, by excluding those branches that have exhibited degraded SNR performance.

As shown in FIG. 1, each base station 110 includes certain hardware components, such as a multi-beam antenna array 105, a processor 120, a data storage device 130, and a transmit/receive section 140. The processor 120 can be linked to each of the other listed elements, either by means of a shared data bus, or dedicated connections, as shown in FIG. 1. The transmit/receive section 140 allows the base station 110 to communicate with other base stations (not shown) and non-stationary subscriber radio units 150.

The data storage device 130 is operable to store one or more tables and/or instructions, which the processor 120 is operable to retrieve, interpret and execute in accordance with the present invention. As shown in FIG. 1, the exemplary base station 110 includes a user list, indicating the non-stationary subscriber radio unit 150 in the vicinity, and a channel allocation process to assign channels to various users. The base station 110 operates in a conventional manner.

Likewise, the non-stationary subscriber radio unit 150 includes certain hardware components, such as a processor 160, a data storage device 170, and a transmit/receive section 180, that operate in a similar manner to the corresponding elements in the wireless communication system 100. In addition, the non-stationary subscriber radio unit 150 also includes a multi-beam antenna array 155 in accordance with the present invention.

In accordance with the present invention, the data storage device 170 includes a beam selection process 300, discussed further below in conjunction with FIG. 3, and a branch ordering table 410, discussed further below in conjunction with FIGS. 4A and 4B. Generally, the beam selection process 300 evaluates the SNR performance of the received signal and controls the selection of branches in the multi-beam antenna array 155 on the basis of SNR performance. The branch ordering table 410 lists the narrow-beam branches within the multi-beam antenna array 155 in the order of their SNR performance.

Figure 2:
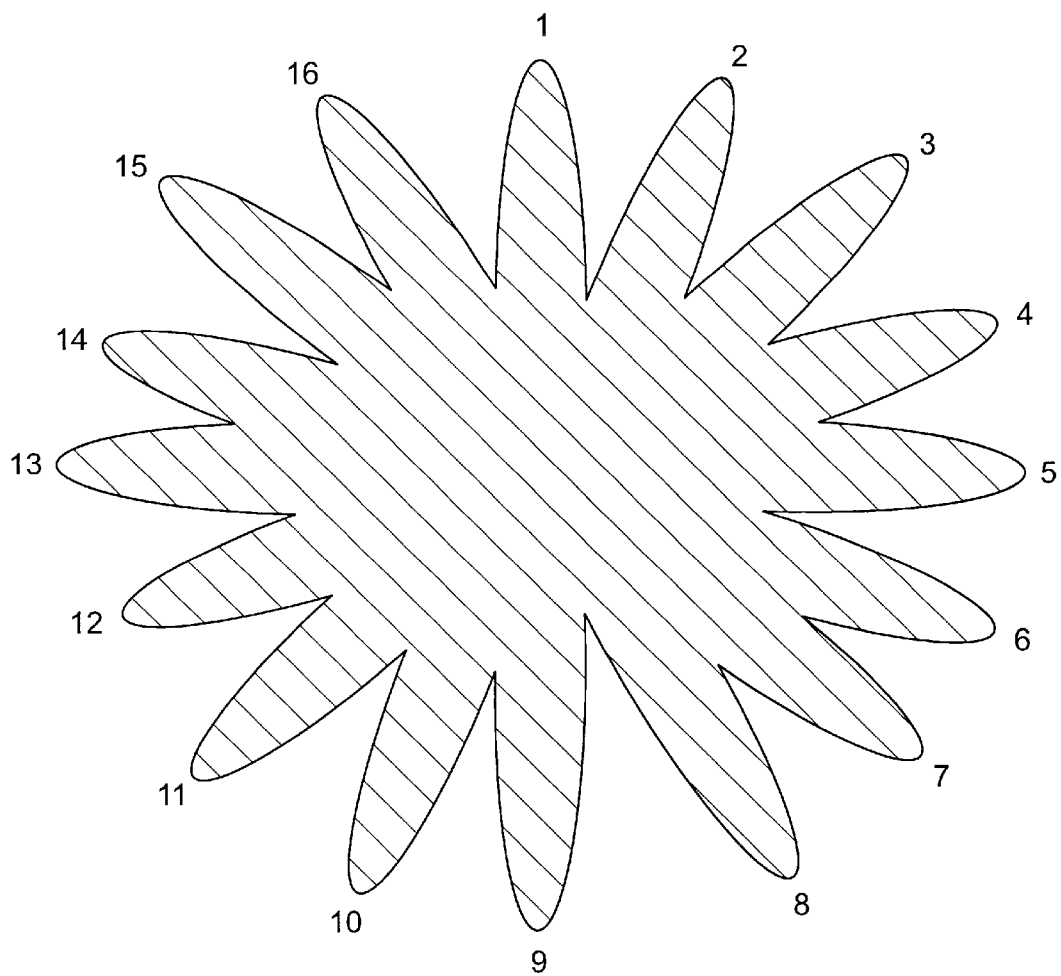
FIG. 2 illustrates the Beam Antenna Pattern for the multi-beam antenna array in the non-stationary subscriber radio unit of FIG. 1.

As previously indicated, the non-stationary subscriber radio unit 150 also includes a multi-beam antenna array 155 in accordance with the present invention. The radiation pattern for a multi-beam antenna array 155 having 16 antennas is shown in FIG. 2.

Multi-Mode Beam Selection

As previously indicated, the present invention utilizes a multi-mode technique for the beam selection process. In the illustrative embodiment, the non-stationary subscriber radio unit 150 may be in a normal mode, an alert mode or a flex mode, on the basis of SNR performance. The non-stationary subscriber radio unit 150 is in a normal mode when the SNR of the received symbol is above a first predefined threshold, Thr_1. The non-stationary subscriber radio unit 150 is in an alert mode (intermediate mode) when the SNR falls below the first threshold, Thr_1, but remains above a second threshold, Thr_2. Finally, the non-stationary subscriber radio unit 150 is in a flex mode when the SNR falls below the second threshold, Thr_2.

Figure 3:
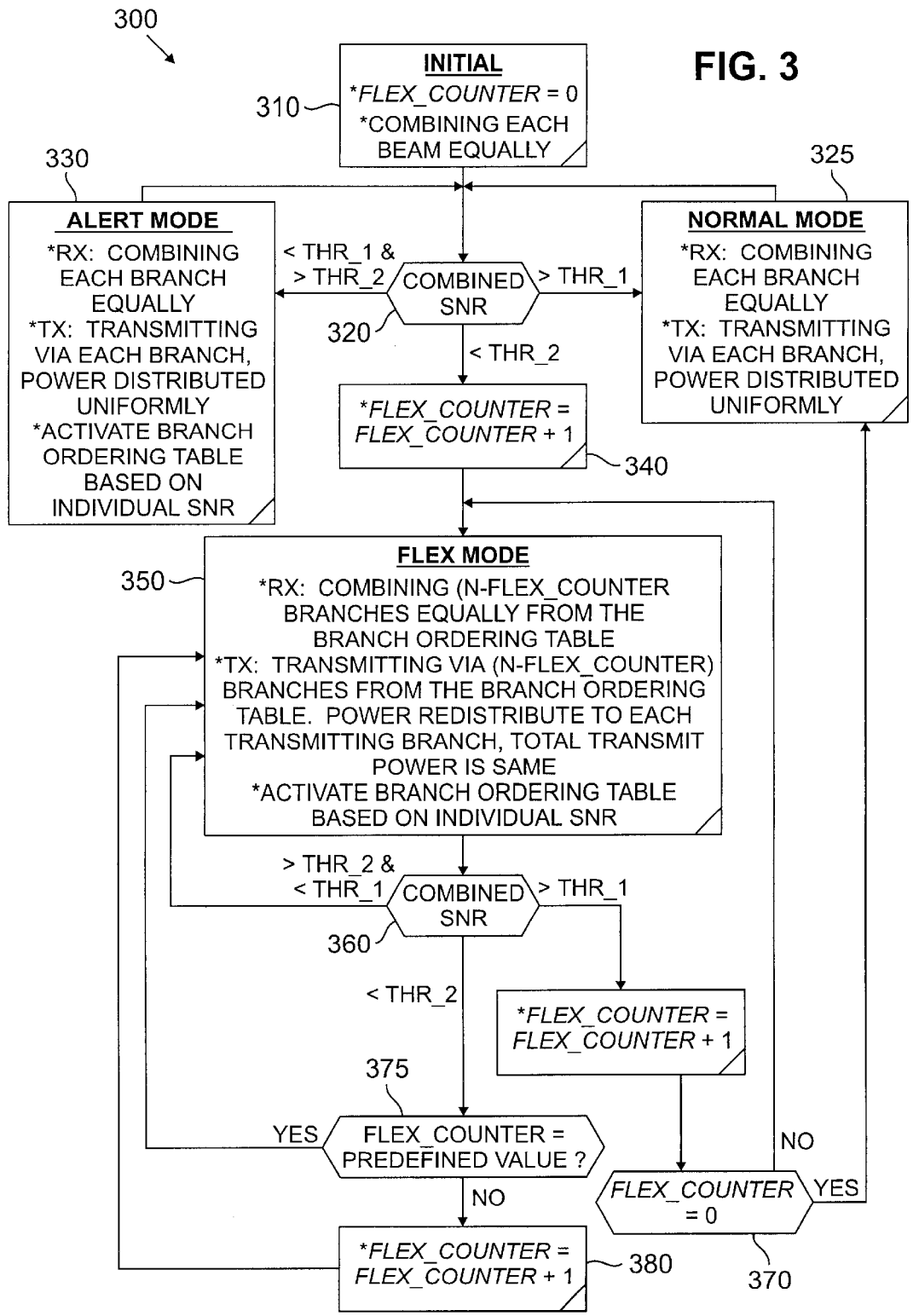
FIG. 3 is a flow chart describing an exemplary beam selection process of FIG. 1.

As previously indicated, the non-stationary subscriber radio unit 150 employs a beam selection process 300, shown FIG. 3, to evaluate the SNR performance of the received signal and control the selection of branches in the multi-beam antenna array 155 on the basis of SNR performance. As shown in FIG. 3, the beam selection process 300 initializes a Flex_Counter (discussed below), to zero during step 310. Generally, the Flex_Counter indicates the number of branches that fail to satisfy predefined SNR performance criteria.

A test is performed during step 320 to determine if the combined SNR of all branches in the multi-beam antenna array 155 exceeds a first threshold, Thr_1 . If the combined SNR of all branches in the multi-beam antenna array 155 exceeds a first threshold, Thr_1, the non-stationary subscriber radio unit 150 enters a normal mode during step 325. Whenever, the non-stationary subscriber radio unit 150 is in a normal mode, the received SNR of the next symbol (or frame or packet) is derived by equally combing the received signal together from each individual narrow-beam antenna branch in the multi-beam antenna array 155. Due to the equal-gain combining, the received antenna pattern acts omni-directional. The transmitted signal is then transmitted via each individual narrow beam. In other words, in the normal mode, the transmitting and receiving antenna patterns are maintained as omni-directional.

As shown in FIG. 3, the non-stationary subscriber radio unit 150 stays in the normal mode until the received SNR falls below the threshold, Thr_1, as detected during step 320. If the SNR falls below the first threshold, Thr_1, but is still larger than the second threshold, Thr_2, the non-stationary subscriber radio unit 150 goes into the alert mode during step 330. If, however, the SNR falls below both the first threshold, Thr_1, and the second threshold, Thr_2, the non-stationary subscriber radio unit 150 increments the Flex_Counter, during step 340 and enters the flex mode during step 350.

Whenever the non-stationary subscriber radio unit 150 is in the alert mode (step 330), the received SNR of the next symbol (or frame, or packet) is derived by equally combing the received signals from each individual narrow-beam antenna branch. At the same time, as discussed below in conjunction with FIGS. 4A and 4B, the branch ordering table 410 is created that lists the narrow-beam branches based on their SNR performance. The transmitted signal is sent via each individual narrow beam. In other words, in the alert mode, the transmitting and receiving antenna patterns are still maintained as omni-direction-like.

When the received SNR of the next symbol (or frame or packet) is again larger than the first threshold (detected during step 320), the system returns to the normal mode (step 325). If the received SNR is still smaller than the first threshold but larger than the second threshold, the non-stationary subscriber radio unit 150 remains in the alert mode (step 330).

If, however, the SNR falls below both the first threshold, Thr_1, and the second threshold, Thr_2, the non-stationary subscriber radio unit 150 increments the Flex_Counter, during step 340 and enters the flex mode during step 350.

Whenever the non-stationary subscriber radio unit 150 is in the flex mode, (step 350), the received SNR of the next symbol (or frame or packet) is derived by equally combing the received signals from all individual narrow-beam branches, except the branches that have been placed in the second part of the branch ordering table 410. The corresponding branch is placed in the second part of the branch ordering table 410 each time the Flex_Counter is incremented (during steps 340 and 380) or decremented (during step 365). In other words, the Flex_Counter provides a pointer into the branch ordering table 410 and all branches in the table 410 having an index less than or equal to (N−Flex_Counter), where N is the total number of antenna elements, are included in the first part of the branch ordering table 410. The transmitted signal will be sent via all branches except the ones that would not be included in the combined received patterns.

During the flex mode (step 350), the power is redistributed into the remaining transmitting branches (those in the first part of the branch ordering table 410). If it is determined during step 360 that the received SNR of next symbol (or frame or packet) is larger than the first threshold, Thr_1, the Flex_Counter is decremented by one during step 365. If it is determined during step 370 that the Flex_Counter reaches zero, the non-stationary subscriber radio unit 150 returns to the normal mode (step 325). If it is determined during step 370 that the Flex_Counter has not yet reached zero, the non-stationary subscriber radio unit 150 remains in the flex mode.

If it is determined during step 360 that the received SNR is smaller than the first threshold, Thr_1, but larger than the second threshold, Thr_2, the non-stationary subscriber radio unit 150 remains in the flex mode.

Finally, if it is determined during step 360 that the received SNR is still below the second threshold, Thr_2, the Flex_Counter will be incremented by one during step 380, unless it is determined during step 375 that the Flex_Counter equals a predetermined value, such as N−1 (thus, the non-stationary subscriber radio unit 150 remains in the flex mode).

FIG. 4A provides an example of the non-stationary subscriber radio unit 150 where three contiguous branches, 14–16, of the multi-beam antenna array 155 have degraded SNR performance and have been included in the second part 420 of the branch ordering table 410. Thus, when the non-stationary subscriber radio unit 150 is in the flex mode, the signals from all individual narrow-beam branches (1 through 13) listed in the first part 415 of the branch ordering table 410 will be equally combined, and the signals from all individual narrow-beam branches (14 through 16) listed in the second part 420 of the branch ordering table 410 will be excluded.

FIG. 4B provides an example of the non-stationary subscriber radio unit 150 where seven discontinues branches, 15, 13, 7, 6, 8, 11, 14, of the multi-beam antenna array 155 have degraded SNR performance and have been included in the second part 420 of the branch ordering table 410. Thus, when the non-stationary subscriber radio unit 150 is in the flex mode, the signals from all individual narrow-beam branches (2, 5, 12, 1, 10, 9, 3, 4, 16, 5) listed in the first part 415 of the branch ordering table 410 will be equally combined, and the signals from all individual narrow-beam branches (15, 13, 7, 6, 8, 11, 14) listed in the second part 420 of the branch ordering table 410 will be excluded.

Figure 5:
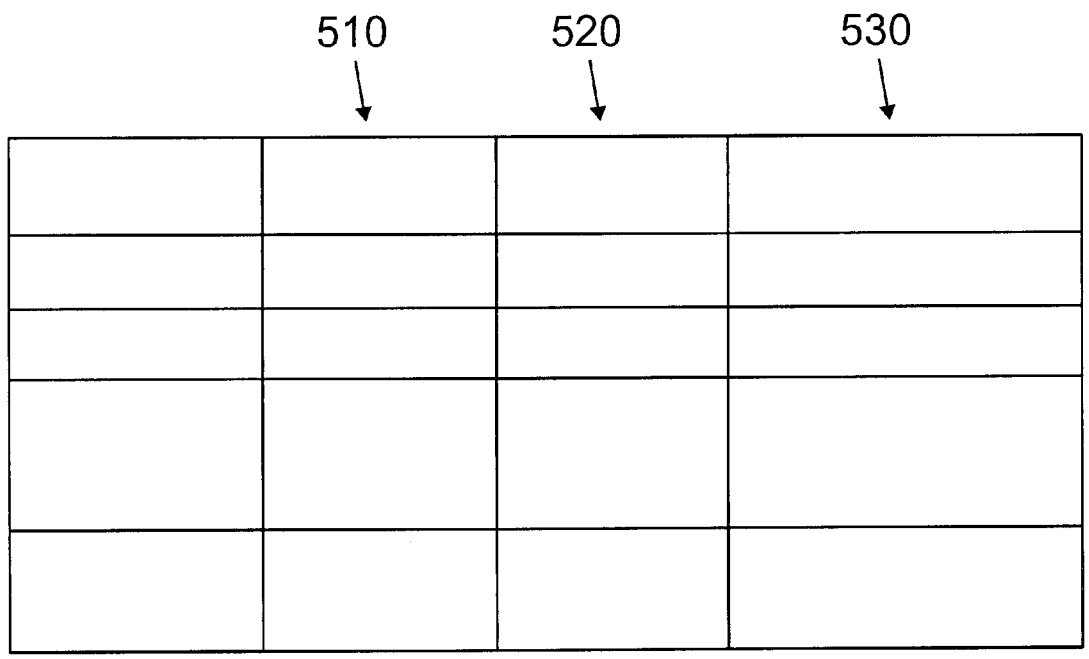
FIG. 5 is a table describing various properties of several operating modes in one multi-mode embodiment of the present invention.

A summary of different operating modes for the illustrative non-stationary subscriber radio unit 150 is shown in FIG. 5. In the normal mode, set forth in column 510, an omni-directional-like radiation pattern is maintained to provide best reception for scattering propagation environments. No additional processing is required. In the alert mode, little effort is required for maintaining the branch ordering table 410. When the non-stationary subscriber radio unit 150 is in the flex mode, due to strong co-channel interference, the flex-beam selection process 300 is activated to alleviate the co-channel interference impact on the receiver by narrowing the radiation pattern. Concurrently, transmitting enhancement is also achieved by redistributing the total power to the remaining activated branches.

It is to be understood that the embodiments and variations shown and described herein are merely illustrative of the principles of this invention and that various modifications may be implemented by those skilled in the art without departing from the scope and spirit of the invention.

We claim:

1. A beam selection method for use in a non-stationary subscriber radio unit having an antenna array, said antenna array comprised of a plurality of narrow beam antenna branches, said method comprising the steps of:

evaluating the signal-to-noise ratio of a signal received on said multi-beam antenna array;

combining said signal received on each of said plurality of narrow beam antenna branches if said signal-to-noise ratio satisfies predefined criteria; and excluding at least one of said narrow beam antenna branches from said combining step if said signal-tonoise ratio fails to satisfy said predefined criteria in order to exclude at least one received signal from a direction associated with said excluded at least one of said narrow beam antenna branches.

2. The method of claim 1, wherein said combining step causes said antenna array to operate in an omni-directional-like manner by equally combining said received signal from each of said individual narrow beam antenna branches.

3. The method of claim 1, further comprising the step of maintaining a branch ordering table that lists said narrow beam antenna branches in said antenna array in order of signal-to-noise ratio performance.

4. The method of claim 3, wherein said excluding step excludes said at least one of said narrow beam antenna branches using said branch ordering table.

5. The method of claim 1, further comprising the step of maintaining a Flex_Counter indicating the number of said narrow beam antenna branches to exclude due to poor degraded signal-to-noise performance.

6. The method of claim 1, wherein said excluding step redistributes power into the remaining transmitting narrow beam antenna branches until the signal-to-noise performance satisfies said predefined criteria.

7. A system for beam selection in a non-stationary subscriber radio unit having an antenna array, said antenna array comprised of a plurality of narrow beam antenna branches, said system comprising:
   a memory for storing computer readable code; and
   a processor operatively coupled to said memory, said processor configured to:
      evaluate the signal-to-noise ratio of a signal received on said multi-beam antenna array;
      combine said signal received on each of said plurality of narrow beam antenna branches if said signal-to-noise ratio satisfies predefined criteria; and
      exclude at least one of said narrow beam antenna branches from said combining step if said signal-to-noise ratio fails to satisfy said predefined criteria in order to exclude at least one received signal from a direction associated with said excluded at least one of said narrow beam antenna branches.

8. The system of claim 7, wherein said processor is further configured to cause said antenna array to operate in an omni-directional-like manner by equally combining said received signal from each of said individual narrow beam antenna branches.

9. The system of claim 7, wherein said processor is further configured to maintain a branch ordering table in said memory that lists said narrow beam antenna branches in said antenna array in order of signal-to-noise ratio performance.

10. The system of claim 9, wherein said processor is further configured to exclude said at least one of said narrow beam antenna branches using said branch ordering table.

11. The system of claim 7, wherein said processor is further configured to maintain a Flex_Counter indicating the number of said narrow beam antenna branches to exclude due to poor degraded signal-to-noise performance.

12. The system of claim 7, wherein said processor is further configured to redistribute power into the remaining transmitting narrow beam antenna branches until the signal-to-noise performance satisfies said predefined criteria.

13. A non-stationary subscriber radio unit, comprising:
   an antenna array comprised of a plurality of narrow beam antenna branches;
   means for combining said signal received on each of said plurality of narrow beam antenna branches if a signal-to-noise ratio of a signal received on said multi-beam antenna array satisfies predefined criteria; and
   means for excluding at least one of said narrow beam antenna branches from said combining step if said signal-to-noise ratio fails to satisfy said predefined criteria in order to exclude at least one received signal from a direction associated with said excluded at least one of said narrow beam antenna branches.

14. The non-stationary subscriber radio unit of claim 13, further comprising means for causing said antenna array to operate in an omni-directional-like manner by equally combining said received signal from each of said individual narrow beam antenna branches.

15. The non-stationary subscriber radio unit of claim 13, further comprising means for maintaining a branch ordering table in said memory that lists said narrow beam antenna branches in said antenna array in order of signal-to-noise ratio performance.

16. The non-stationary subscriber radio unit of claim 15, further comprising means for excluding said at least one of said narrow beam antenna branches using said branch ordering table.

17. The non-stationary subscriber radio unit of claim 13, further comprising means for maintaining a Flex_Counter indicating the number of said narrow beam antenna branches to exclude due to poor degraded signal-to-noise performance.

18. The non-stationary subscriber radio unit of claim 13, further comprising means for redistributing power into the remaining transmitting narrow beam antenna branches until the signal-to-noise performance satisfies said predefined criteria.

* * * * *

UNITED STATES PATENT AND TRADEMARK OFFICE
CERTIFICATE OF CORRECTION

PATENT NO. : 6,701,165 B1
DATED : March 2, 2004
INVENTOR(S) : Ho et al.

It is certified that error appears in the above-identified patent and that said Letters Patent is hereby corrected as shown below:

Title page,
Item [56], References Cited, insert the following FOREIGN PATENT DOCUMENTS:

-- GB 1,180,440 A
GB 2,294,609 A --

Signed and Sealed this

Thirty-first Day of August, 2004

JON W. DUDAS
*Director of the United States Patent and Trademark Office*